Patented Sept. 27, 1932

1,878,997

UNITED STATES PATENT OFFICE

LUIS ADELANTADO, OF BARCELONA, SPAIN

MANUFACTURE OF PHOSPHATES AND PHOSPHORIC ACID

No Drawing. Application filed June 5, 1929, Serial No. 368,738, and in Spain February 19, 1929.

This invention relates to the manufacture of phosphates and phosphoric acid, and more specifically to the manufacture of concentrated superphosphates and phosphoric acid.

It is well known that the fertilizing value of a superphosphate is a function of the percentage of phosphoric anhydride contained in the natural phosphates employed as raw material. This accounts for the fact that raw phosphates containing a sufficiently high proportion of phosphoric anhydride have to be employed for the production of any definite superphosphate. The natural phosphate ordinarily available in this country does not have a high phosphoric anhydride content, so that phosphate must be imported to supply the highest percentage of phosphoric anhydride usually demanded in the production of superphosphates from natural phosphate.

It is also a well known fact that in the so-called industry of double superphosphates, phosphoric acid is employed for the treatment of natural phosphates to render them soluble. Depending on the richness of the raw phosphate employed, products containing 30% to 48% of water soluble phosphoric anhydride are obtained. Even supposing that a raw phosphate containing 75-80% of tricalcic phosphate is employed, the major part of the impurities contained in it remain as such in the resultant double superphosphate, reducing the percentage content of fertilizing element. To compensate for this and for other reasons, for example, to guard against any possible retrogradations, manufacturers sometimes add an excess of phosphoric acid, which gives rise to an acid product which is very difficult to dry.

Owing to the above and to other disadvantages the double superphosphate industry has declined. Nevertheless, a few double superphosphate factories are still working, and more would have been in existence if it were possible to overcome the difficulties involved in the manufacture of phosphoric acid and in the drying of the double superphosphate.

Attempts have also been made to manufacture the so-called triple superphosphate by mixing concentrated phosphoric acid with calcium carbonate, precipitated calcium phosphate or calicum hydrate. A product containing 48–50% phosphoric anhydride has thus been obtained. This method, however, has not been an industrial success.

Part of the difficulty in connection with superphosphate work is due to the fact that superphosphate is a mass which is not lixiviable and any attempt to permit liquid to percolate through the superphosphate in a more or less powdered condition with a view to extract from the same all soluble matter results in the mass absorbing water and then forming a magma through which water will not percolate.

The object of the present invention is to provide an improved or modified industrial process for the manufacture of concentrated superphosphates and phosphoric acid.

The invention in brief consists in a process for rendering superphosphate lixiviable, according to which the superphosphate is treated with ammonia until it is substantially neutral to methyl orange.

The invention also consists in a process according to which superphosphate is rendered substantially neutral to methyl orange by means of ammonia and then subjected to lixiviation by water or water slightly acidulated with sulphuric acid or the like in the hot or cold state, after which, if desired, the solution may be evaporated to a suitable density for the production of crystals which may be washed, drained and dried.

The following examples illustrate how the invention may be carried into effect:—

*Example 1*

Raw material:—
  Logrosan phosphate 50.84% tricalcic phosphate
  51° Bé. sulphuric acid.

Anhydrous ammonia or an aqueous solution thereof. A complete analysis of the Logrosan phosphate showed that 51.93 litres of 51° Bé. sulphuric acid were theoretically needed to convert 100 kilos of the mentioned phosphate into superphosphate. On carrying out preliminary trials, it was observed that by using the above quantity of acid the resulting superphosphate was tolerably dry but contained very high proportions of insoluble phosphate. On increasing the quantity of acid, the insoluble was reduced to a minimum but the resultant superphosphate was very damp. Striking a middle course, the following quantities were employed:—

Logrosan phosphate _____ 100 kilos
51° Bé. sulphuric acid _____ 63 litres

The superphosphate thus obtained gave the following figures on analysis:—

|  | Per cent |
|---|---|
| Phosphoric anhydride soluble in water | 10.99 |
| do do insoluble in water | 1.48 |
| Total phosphoric anhydride | 12.47 |
| Moisture | 17.24 |
| Free acidity expressed in terms of $H_2SO_4$ | 5.06 |

The above superphosphate was subjected to the action of ammonia vapours in a closed chamber until the free acidity was neutralized, (indicator:—methyl orange). The neutralized superphosphate contained:

|  | Per cent |
|---|---|
| Moisture | 12.45 |
| Ammonia | 1.75 |

This product was subjected to a systematic process of leaching from which a leached liquor containing 204.80 grammes of $P_2O_5$ per litre and density of about 27° Bé. (specific gravity about 1.23) was obtained. When the above leach liquor was evaporated down to a density of 35° Bé. while hot, and then left to cool for a period of eight hours, an abundant supply of crystals consisting in the major part of rhombic crystals of monocalcium phosphate with some other crystals of a different shape, in admixture with small quantities of an amorphous powder separated out. This amorphous powder was found to be composed of a mixture of monocalcium phosphate without water of crystallization and of bicalcium phosphate, resulting from the reaction between the small quantities of alkaline phosphates present in the liquor and the calcium sulphate carried over in leaching. The crystals, in admixture with the monocalcium phosphate crystals, are composed of a mixture of sulphate and phosphates of ammonia. These mixed crystals proceeding from the hydroextractor drained and dried in a current of hot air gave the following figures on analysis:—

|  | Per cent |
|---|---|
| $P_2O_5$, soluble in water | 53.27 |
| $P_2O_5$, soluble in citrate of ammonia | 2.41 |
| Total $P_2O_5$ | 55.68 |
| Ammoniacal nitrogen | 5.34 |
| Equivalent $NH_3$ | 6.65 |

No insoluble $P_2O_5$ was present. The product in question was neither hygroscopic nor deliquescent.

When the above crystals were thoroughly washed in the hydroextractor, the more soluble salts dissolved out, and the final product had the following composition:—

|  | Per cent |
|---|---|
| $P_2O_5$ soluble in water | 55.168 |
| $P_2O_5$ soluble in ammonium citrate | 2.410 |
| Total $P_2O_5$ | 57.578 |

No insoluble $P_2O_5$ was present, and only traces of $NH_3$ were detected, which proved that the crystals were almost exclusively of monocalcium phosphate, excepting the small quantity of bicalcium phosphate corresponding to the small percentage of $P_2O_5$ soluble in ammonium citrate.

The residue from the leaches consisted mainly of $CaSO_4$ together with other insoluble matter present in the superphosphate. It contained only traces of water soluble $P_2O_5$.

*Example 2*

Raw materials:—
Moroccan phosphate containing 73.27% tricalcium phosphate
Sulphuric acid 53° Bé.
Aqueous solution of ammonia containing 19.9% $NH_3$.

For every 100 kilos of the above phosphate 110.428 kgs. of 53° Bé. $H_2SO_4$ are needed to convert the same into superphosphate of the following composition:—

|  | Per cent |
|---|---|
| $P_2O_5$ soluble in water | 17.40 |
| $P_2O_5$ insoluble in water | 1.20 |
| Total $P_2O_5$ | 18.60 |
| Moisture | 9.50 |
| Free acid (expressed in terms of $H_2SO_4$) | 2.94 |

1.02% of $NH_3$ are required to neutralize the above acidity, which means 5.125 litres of the ammoniacal solution per 100 kgs. of the superphosphate.

After neutralizing, the above superphosphate contained 12.15% moisture and 1.00% ammonia.

A 32° Bé. liquor of specific gravity 1.2786 containing 275.20 grs. of $P_2O_5$ per litre was obtained when the above product was subjected to the process of leaching. This liquor was concentrated to a density of 40° Bé. in the hot state and left to cool for a period of six hours. The resulting crop of crystals was drained and dried. They had the following composition:—

|  | Per cent |
|---|---|
| Water soluble $P_2O_5$ | 52.73 |
| $P_2O_5$ soluble in citrate of ammonia | 2.31 |
| Total $P_2O_5$ | 55.04 |
| Ammoniacal nitrogen | 3.10 |
| Equivalent $NH_3$ | 3.78 |
| Oxides of Fe and of Al soluble in water | Nil |
| Oxides of Fe and of Al insoluble in water | 2.00 |

No insoluble $P_2O_5$ could be detected.

The residue resulting from the leaches contained 0.073 of $P_2O_5$ soluble in water, which is a negligible quantity for an industrial process.

The salts of iron and of aluminium could be separated by filtering the leached liquor before crystallization or else by recrystallization. When the filtered liquor was left to crystallize and the crystals thoroughly washed on the hydro-extractor, the resulting product consisted mainly of monocalcium phosphate which could be dried with difficulty and was hygroscopic. The unwashed crystals, that is to say, the product containing small proportions of alkaline phosphates, were not hygroscopic, and consequently the presence of these salts may be an advantage, depending on the use for which the manufactured product is intended.

Inference could be drawn from the examples cited above that a superphosphate which does not contain free acid is leachable. It is true in the case of certain phosphates which comply with other essential requisites, but is not applicable as a general rule to all classes of phosphates. In any case there is a considerable loss of $P_2O_5$ and the final product could only be dried with difficulty, as on concentrating the leach liquor, most of the monocalcium phosphate separates out without its water of crystallization.

It is practicable to eliminate calcium from the solutions of monocalcium phosphate by treatment with sulphuric acid. Calcium sulphate is precipitated and the decanted clear liquor contains orthophosphoric acid.

*Example 3*

Raw materials:—
    Liquor 32° Bé. containing monocalcium phosphate obtained as under Examples 1 and 2
    Sulphuric acid 66° Bé.

The above liquor contains 337.48 grs. of monocalcium phosphate per litre. To precipitate the calcium contained therein, 115.377 grs. of sulphuric anhydride (76.713 cc. of sulphuric acid 66° Bé.) are required. The acid is added and the liquor brought to a temperature between 60° and 80° C. The major part of the calcium sulphate is precipitated and the supernatant liquid is decanted. (Density 1.3172 equivalent to 34.5° Bé.).

It was found to contain:—

|  | Per cent |
|---|---|
| Phosphoric anhydride | 34.83 |
| Equivalent orthophosphoric acid | 48.06 |

Starting with more concentrated liquors, solutions richer in orthophosphoric acid could be obtained, but they contain small quantities of calcium sulphate and monocalcium phosphate. These impurities may be removed by treatment with alcohol in which they are insoluble and pure orthophosphoric acid may then be obtained by distilling off the alcohol.

The solution of orthophosphoric acid may be used for the manufacture of free phosphorus by any suitable method. If, instead of free sulphuric acid, alkaline sulphates are used to precipitate the calcium out of the liquors containing monocalcium phosphate, alkaline phosphates are formed. Such solutions when evaporated down to adequate concentrations and cooled, produce crystals of the said phosphates which on being drained and dried constitute concentrated alkaline superphosphates.

*Example 4*

Raw materials:—
    32° Bé. leach liquor containing monocalcium phosphate obtained as under Examples 1 and 2
    Potasium sulphate 95%.

The following quantities enter into reaction.

For each litre of the 32° Bé. liquor, 264.14 grs. of 95% potassium sulphate are used. The mixture is brought to a temperature between 60° and 90° C., when the major part of the calcium is precipitated as sulphate. The clear liquor is decanted off and concentrated to a density of 40° Bé. in the hot state. When left to cool, crystals composed, in the major part, of monopotassium phosphate are thrown down. The following is the analysis of these dry crystals:—

|  | Per cent |
|---|---|
| $P_2O_5$ soluble in water | 40.28 |
| $K_2O$ | 27.32 |

The above analysis shows that a small portion of potassium exists in the form of sulphate. The presence of small quantities of monocalcium phosphate has also been detected.

Monosodium or monoammonium phosphates or binary mixtures of the three monoalkaline phosphates may be obtained in an analogous manner, all of which constitute concentrated alkaline superphosphates.

Mono or bialkaline phosphates may be obtained directly, without the intervention of the sulphates, by an adequate neutralization of the orthophosphoric acid, contained in the liquor, by means of the corresponding alkalies.

*Example 5*

Ammonia gas is bubbled through the crude liquor containing orthophosphoric acid. (34.5° Bé.) mentioned under Example 3, in the same way as in the manufacture of ammonium sulphate. Depending on the concentration of the orthophosphoric acid in the liquor, crystals of mono or di-ammonium phosphate are immediately formed, or the liquor should be concentrated to induce crystallization on cooling. For the obtention of diammonium phosphate, dilute solutions of ortho-phosphoric acid have to be employed, and then the liquor has to be concentrated to induce crystallization. Care should be taken to avoid loss of ammonia during concentration, and if any loss occurs, the necessary amount of ammonia should be added to the concentrated solution.

Potassium and sodium phosphates may be obtained in an analogous manner from the solution of orthophosphoric acid by the addition of caustic potash or caustic soda. Binary alkaline phosphates may also be obtained in a similar manner. In all these cases the products constitute concentrated alkaline superphosphates.

General

By working as described above—

1. Any raw phosphate however low in concentration could be used.

2. Superphosphates richer in phosphoric anhydride than double superphosphates resulting from any raw phosphate of the highest available concentration are obtained.

3. The concentrated superphosphates obtained are neither deliquescent, nor hygroscopic; they do not contain free phosphoric acid and are free from retrogradation troubles.

4. There is no difficulty in producing the concentrated superphosphates on an industrial scale in such a manner that a cheap fertilizer is obtained.

5. During the course of manufacture, orthophosphoric acid is easily recovered.

6. Through the same method, concentrated alkaline superphosphates are easily obtained at very cheap cost.

7. The residue left behind consists mostly of calcium sulphate and the insoluble impurities contained in the raw phosphate treated plus a small percentage of phosphoric anhydride inevitably lost in all industrial manipulations.

As a summary of the preferred process calcium superphosphate is made by any suitable method but in such a way that the free acid is reduced to the lowest possible minimum, consistent with complete solubilization of the phosphate contained in the raw material. The free acid contained in the superphosphate thus obtained is then totally or partially neutralized by means of ammoniacal gases or by spraying on to it ammoniacal solutions, under appropriate conditions of humidity. The mass thus prepared is then subjected to a systematic leaching, using water or any other solvent suitable for the purpose. Solutions whose density ranges between 1.20 and 1.33 corresponding to 25–35° Bé. are thus obtained.

These solutions are subsequently concentrated by adequate evaporation and when left to cool, crystals of monocalcium phosphate along with those of other phosphates and sulphates containing the basic radicle corresponding to the alkali used to neutralize the superphosphate are formed. These two latter compounds may be removed by washing the crystals while being drained in a hydroextractor. The crystals when drained off the mother liquor may be easily dried in a current of hot air. The washed and mother liquors may be employed again in the cycle of operations.

I claim:

1. An industrial process for the manufacture of concentrated superphosphates and of phosphoric acid which consists in first neutralizing the free acid in superphosphate with a solution of ammonia gas, then systematically leaching the resulting product with water to obtain solutions of the soluble salts and then evaporating said solutions to an adequate density of about 35° Bé. to form crystals, and lastly washing, draining and drying the resultant crystals while cooling for about 8 hours.

2. A process for the preparation of concentrated phosphatic materials by extracting raw superphosphate with water, which consists in first neutralizing the free acid of the raw superphosphate with ammonia gas in order to make the superphosphate leachable, thereupon lixiviating the product for the purpose of obtaining saline solutions and subsequently recovering the salts in the solutions by concentrating the solutions and crystallizing the salts therefrom.

3. A process for the manufacture of concentrated phosphatic fertilizers which consists in first neutralizing with ammonia the free acid of the superphosphate obtained according to known processes, then effecting a methodical lixiviation of the mass with water, then evaporating the obtained slightly concentrated solutions until the specific weights are obtained suitable for crystallization and finally, washing, draining and drying the formed crystals.

In testimony whereof I have signed my name to this specification.

LUIS ADELANTADO.